United States Patent [19]
Job

[11] Patent Number: 5,122,494
[45] Date of Patent: Jun. 16, 1992

[54] OLEFIN POLYMERIZATION CATALYST

[75] Inventor: Robert C. Job, Houston, Tex.

[73] Assignee: Shell Oil Company, Houston, Tex.

[21] Appl. No.: 657,036

[22] Filed: Feb. 19, 1991

[51] Int. Cl.$^5$ .............................. C08F 4/654
[52] U.S. Cl. .................... 502/125; 502/133; 526/124
[58] Field of Search ................. 502/125, 133

[56] References Cited

U.S. PATENT DOCUMENTS

| | | | |
|---|---|---|---|
| 4,472,521 | 9/1984 | Band | 502/125 X |
| 4,710,482 | 12/1987 | Job | 502/125 X |
| 4,902,761 | 2/1990 | Suga et al. | 502/125 X |

Primary Examiner—Patrick P. Garvin

[57] ABSTRACT

A high activity olefin polymerization catalyst, useful in the polymerization of lower α-olefins, comprises the solid product resulting from contacting a complex magnesium-containing, titanium-containing alkoxide compound with alkylaluminum halide, optionally employed in conjunction with a selectivity control agent.

12 Claims, No Drawings

OLEFIN POLYMERIZATION CATALYST

FIELD OF THE INVENTION

This invention relates to a high activity olefin polymerization catalyst, to a method for the production thereof and to a process for the polymerization of olefins in the presence of that catalyst.

BACKGROUND OF THE INVENTION

The production of polymers and copolymers of lower α-olefins, particularly propylene and ethylene, has gained substantial commercial importance. The polymeric products are relatively inexpensive and exhibit a number of commercially useful properties. In the case of the polymerization of ethylene, the process is relatively uncomplicated in that the product type is not influenced by the manner in which the ethylene molecules add to the growing polymeric chain and the polymer product does not exist in stereoisomeric forms.

In the case of polypropylene, however, the presence of pendant methyl groups on the polymeric chain provides the possibility of several product types depending on the stereoregularity with which the propylene molecules add to the growing chain. Much if not most of the commercial polypropylene is crystalline and results from the stereoregular addition of propylene molecules in a regular head-to-tail manner. The form of polypropylene having a substantial proportion of random addition is termed atactic and this amorphous form of the polymer is less desirable. If present in a significant proportion, the atactic polypropylene must be removed as by an extraction process to provide the more desirable crystalline material. Also significant from a commercial standpoint is the activity of the polymerization catalyst. A number of the early polymerization catalysts, e.g., trivalent titanium, chromium or vanadium, were of relatively low activity and the polymeric product contained significant amounts of catalyst residues. The removal of such residues as by a deashing step was required in order to obtain commercially acceptable properties.

The more recent olefin polymerization catalysts, generally based on titanium and particularly tetravalent titanium, are more stereoregulating and of sufficient activity so that extraction and deashing steps are not required. In terms now employed conventionally, the high activity olefin polymerization catalysts are formed from a solid catalyst component, often termed a procatalyst, which typically contains magnesium, titanium and halide moieties, a cocatalyst which is usually an organoaluminum compound and a selectivity control agent which may be provided as a partial or total complex with the cocatalyst. Although each of these three components has a significant influence on the catalyst and the polymerization process, as well as on the polymeric product so produced, the nature of the catalyst and the polymeric product appear to be most influenced by the procatalyst and much of the research directed toward catalyst improvement has been devoted to solid catalyst components.

Many of the procatalyst species arise from treatment of a magnesium compound with tetravalent titanium halide, often in the presence of a halohydrocarbon and an electron donor. Kioka et al, U.S. Pat. No. 4,330,649, describe a solid catalyst component (procatalyst) obtained by heating a soluble magnesium compound with a higher alcohol in the presence of an ester to produce a solution. To this solution is added titanium tetrachloride and an electron donor to form the procatalyst. Band, U.S. Pat. No. 4,472,521, reacts a magnesium alkoxide wherein each alkoxide moiety has 4 or more carbon atoms in the presence of an aromatic hydrocarbon. Titanium tetrachloride and an electron donor are added to the resulting solution to form a solid procatalyst which is then post-treated with a transition metal halide. Arzoumanides, U.S. Pat. No. 4,540,679, produces an olefin polymerization catalyst component by contacting a suspension of magnesium ethoxide in ethanol with carbon dioxide. The addition of organoaluminum compound in hydrocarbon results in the production of granular particles which are employed as support for a titanium compound upon contact of the particles with titanium tetrachloride. Nestlerode et al, U.S. Pat. No. 4,728,705, solubilize magnesium ethoxide in ethanol with carbon dioxide and spray dry the resulting solution or use the solution to impregnate carrier particles. The solid particles obtained by either modification are contacted with titanium tetrachloride to form a procatalyst.

A somewhat different process is described by Job, U.S. Pat. No. 4,710,428, wherein a magnesium compound of the general formula $$Mg_4(OR)_6(ROH)_{10}A \qquad (I)$$

is formed wherein R independently is lower alkyl of up to 4 carbon atoms and A is at least one anion having a total oxidation state of $-2$. This magnesium complex is contacted with a tetravalent titanium halide, a halohydrocarbon and an electron donor to form the procatalyst.

More recently, olefin polymerization procatalyst precursors have been produced which contain titanium moieties as well as magnesium moieties. In copending U.S. patent application Ser. No. 599,610, filed Oct. 18, 1990 and now U.S. Pat. No. 5,106,806 there is produced a complex alkoxide compound having the illustrative general stoichiometry of $$Mg_3Ti(OR)_8X_2 \qquad (II)$$

wherein R has the previously stated meaning and X is an anion derived from a phenolic compound. Such complex alkoxides are produced from a magnesium alkoxide, a titanium tetraalkoxide and the phenolic compound in alkanolic solvent. Alkanol is removed from a solution of this product in hydrocarbon or halohydrocarbon to provide a clear solution. A solid procatalyst is produced by the addition of a tetravalent titanium halide and an electron donor to the solution. The procatalyst is then converted to a polymerization catalyst by contacting with an organoaluminum compound and a selectivity control agent. This catalyst is an effective high activity olefin polymerization catalyst and provides polymeric product having good properties in high yield (high catalyst productivity). However, it would be of advantage to provide a simplified method of producing such an olefin polymerization catalyst.

SUMMARY OF THE INVENTION

The present invention provides a process for the production of an olefin polymerization catalyst by contacting the solid reaction product of a magnesium alkoxide, a titanium tetraalkoxide and a phenolic compound. such reaction products are complex alkoxide compounds of the illustrative general formula $$Mg_3Ti(OR)_8X_2 \quad (II)$$

wherein R independently is alkyl of up to 4 carbon atoms and X is a monovalent anion derived from a phenolic compound, with an alkylaluminum halide. The resulting particulate solid, optionally employed with a selectivity control agent, is useful without further treatment as an olefin polymerization catalyst. The invention also relates to a process for the polymerization of α-olefins in the presence of the catalyst.

DESCRIPTION OF THE INVENTION

The present invention contemplates the formation of an olefin polymerization catalyst by contacting an alkylaluminum halide halogenating agent with a complex magnesium-containing, titanium-containing alkoxide compound prepared by reaction of magnesium alkoxide, titanium tetraalkoxide and a phenolic compound. The complex alkoxide compounds are of somewhat variable stoichimetry but have the general illustrative formula $$Mg_3Ti(OR)_8X_2 \quad (II)$$

wherein R independently is alkyl of up to 4 carbon atoms inclusive and X independently is a monovalent anion derived from a phenolic compound as described below. The resulting catalyst, employed in the presence of or in the absence of a selectivity control agent, is used to polymerize or copolymerize lower α-olefins such as ethylene or propylene. The polyolefin product is produced at a relatively high catalyst productivity and has good properties.

The complex magnesium-containing, titanium-containing alkoxide compound is produced by reacting a magnesium alkoxide, a titanium tetraalkoxide and a phenolic compound in the presence of an inert reaction diluent. The diluent is then removed to produce, as a particulate solid, the complex alkoxide compound. This solid is treated with alkylaluminum halide to produce the olefin polymerization catalyst of the invention. This catalyst is used, in the optional presence of selectivity control agent, to promote the polymerization of lower α-olefins by polymerization techniques which are largely conventional.

The alkoxide moieties of the magnesium alkoxide are the same as or are different from the alkoxide moieties of the titanium tetraalkoxide. Moreover, the alkoxide moieties of one metal alkoxide reactant are the same as or are different from the alkoxide moieties of the other metal alkoxide reactant. In part for reasons of complex alkoxide purity, it is preferred that all alkoxide moieties of both metal alkoxides be the same. The preferred alkoxide moieties are methoxide or ethoxide (R is methyl or ethyl) and particularly preferred is ethoxide. Magnesium ethoxide and titanium tetraethoxide are the preferred metal alkoxide reactants for the production of the complex metal alkoxide compound.

The phenolic compound used as reactant in the production of the complex alkoxide compound is selected from phenol or an activated phenol. By the term "activated phenol" is meant a monohydroxylic phenol of one aromatic ring having aromatic ring substituents other than hydrogen which serve to alter the pKa of the phenolic compound. Such substituent groups are free from active hydrogen atoms and include halogen, e.g., chlorine or bromine, alkyl and particularly alkyl of up to 4 carbon atoms inclusive, and dialkylamino wherein each alkyl has up to 4 carbon atoms inclusive. Suitable substituent groups do not include hydroxy or aldehyde. Illustrative of suitable phenolic compounds are phenol, p-cresol, o-cresol, 3-methoxyphenol, 2,6-di-t-butyl-4-methylphenol (BHT), 2,4-diethylphenol, p-chlorophenol, p-bromophenol, 2,4-dichlorophenol, p-dimethylaminophenol and m-diethylaminophenol.

The contacting of the magnesium alkoxide, titanium tetraalkoxide and phenolic compound takes place at an elevated temperature in an inert reaction diluent. The reaction diluent is one in which all reactants are at least partially soluble and which does not react with the reactants or the complex alkoxide product. Preferred reaction diluents are hydrocarbon such as isooctane, isopentane or n-heptane, or are halohydrocarbon such as methylene chloride, carbon tetrachloride or chlorobenze. The contacting takes place at a reaction temperature from about 50° C. to about 90° C. Contacting is effected in a suitable reactor and is facilitated by conventional procedures such as shaking, stirring or refluxing. The phenolic compound is provided in a quantity of from about 0.1 mole to about 4 moles per mole of titanium tetraalkoxide but preferably in a quantity of from about 0.5 mole to about 2 moles per mole of titanium. The magnesium alkoxide is provided in a quantity from about 1.5 mole to about 8 moles per mole of titanium tetraalkoxide. Preferred quantities of magnesium alkoxide are from about 3 moles to about 6 moles per mole of titanium alkoxide.

The product of the contacting of the magnesium alkoxide, the titanium tetraalkoxide and phenolic compound in the inert reaction diluent is a solution of the complex alkoxide compound in the diluent. To obtain the solid complex alkoxide compound, the complex alkoxide compound is separated from the diluent. In one modification, a non-solvent is added to precipitate the complex alkoxide compound which is then recovered as by filtration. In a preferred modification, however, the reaction diluent is removed as by distillation or evaporation. In a modification of solvent removal by distillation, a cosolvent is added which forms an azeotrope with the reaction diluent and the distillation is azeotropic and conducted at a temperature somewhat lower than the boiling point of the reaction diluent. In a second and preferred modification of removal by distillation, the reaction diluent is removed by a simple distillation at or below atmospheric pressure. The solid product resulting from either modification is the complex alkoxide compound useful as a catalyst component.

The conversion of the complex alkoxide compound to the olefin polymerization catalyst is by treatment with alkylaluminum halide. Suitable alkylaluminum halides have from 1 to 2 alkyl groups independently of up to 8 carbon atoms and from 2 to 1 halide moieties. The preferred alkylaluminum halides are represented by the formula $$R_nAlY_{3-n} \quad (III)$$

wherein R has the previously stated meaning, Y is chlorine or bromine and n is 1 or 2. Illustrative of such alkylaluminum halides are ethylaluminum dichloride, diethylaluminum chloride, diethylaluminum bromide, propylaluminum dibromide, dibutylaluminum chloride and methylaluminum dibromide. In general, the compounds of the above formula III wherein n is 2 are preferred as are the compounds wherein R is ethyl.

Particularly preferred as alkylaluminum halide is ethylaluminum dichloride.

The reaction of the solid complex alkoxide compound and the alkylaluminum halide is conducted by contacting the reactants. Insofar as many of the alkylaluminum compounds are liquid, a preferred method of contacting is by mixing the alkylaluminum halide and the complex alkoxide compound at an elevated temperature. Suitable contacting temperatures are from about 20° C. to about 100° C., but preferably from about 35° C. to about 90° C. To insure adequate contacting a diluent such as a hydrocarbon or halohydrocarbon may be used but in other modifications, no diluent is present during the contacting. Subsequent to the contacting of alkylaluminum halide and complex alkoxide compound the resulting solid is typically washed with light hydrocarbon, e.g., isooctane, to remove unreacted materials. This solid is useful as such as an olefin polymerization catalyst.

The alkylaluminum halide is provided in an amount of from about 1 mole to about 150 moles per mole of titanium of the complex alkoxide compound. Preferred quantities of alkylaluminum halide are from about 10 moles to about 30 moles per mole of titanium.

The olefin polymerization catalyst is utilized in the presence or in the absence of a selectivity control agent. The suitable selectivity control agents when such are employed are the selectivity control agents conventionally employed with olefin polymerization catalysts based on titanium and aluminum. Such selectivity control agents are free from active hydrogen atoms and include esters, ethers, amines, imines, nitriles, phosphines, arsines, stibines and silanes. The preferred selectivity control agents are esters, particularly alkyl esters of aromatic monocarboxylic or dicarboxylic acids, or are alkylalkoxysilanes of the formula

$$R_n Si(OR)_{4-n} \qquad (IV)$$

wherein R and n have the previously stated meanings. Illustrative of preferred ester selectivity control agents are methyl benzoate, ethyl benzoate, ethyl p-ethoxybenzoate, ethyl p-methylbenzoate, diisobutyl phthalate, dimethyl naphthalenedicarboxylate and diisopropyl terephthalate. Illustrative of the preferred alkylalkoxysilane selectivity control agents are diisobutyldimethoxysilane, isopropyltrimethoxysilane, isobutyltrimethoxysilane and cyclohexylmethyldimethoxysilane.

As previously stated, the olefin polymerization catalyst is useful in the polymerization of α-olefins with or without the presence of selectivity control agent. In the embodiment of the invention where no selectivity control agent is employed, the catalyst as produced above is added directly to the polymerization zone in which polymerization takes place. In the embodiment of the invention where the catalyst is utilized in conjunction with a selectivity control agent, the catalyst and selectivity control agent are added separately to the polymerization reactor or are mixed prior to introduction to the polymerization zone. When the catalyst and selectivity control agent are premixed it is often useful to heat the resulting mixture to a temperature at or about polymerization temperature prior to introduction into the reaction zone.

The olefin polymerization catalyst as produced from the complex alkoxide compound and the alkylaluminum halide is useful in the polymerization of lower α-olefins under polymerization conditions and particularly useful in the polymerization of straight-chain α-olefins of up to 4 carbon atoms inclusive, i.e., ethylene, propylene and 1-butene. The precise procedures of the polymerization process are broadly conventional but the olefin polymerization process of the invention, by virtue of the use therein of the catalyst formed from the complex alkoxide compound and the alkylaluminum halide, provides polyolefin product of good properties in quantities which reflect the relatively high productivity of the olefin polymerization catalyst. The polymerization product is suitably a homopolymer such as polyethylene or polypropylene when a single α-olefin monomer is supplied to the polymerization process. Alternatively, the polymerization process is useful in the production of copolymers such as ethylene-propylene rubber or polypropylene impact copolymer when two or even more α-olefin monomers are employed in the polymerization process. The nature of the desired polymer product will, however, influence the composition of the catalytic species with regard to the presence or absence of selectivity control agent. When the desired product is polyethylene or polyethylene copolymer or other product where stereoregularity of the product is not desired, the selectivity control agent is not typically provided, although no apparent detriment results from its inclusion within the reaction mixture. However, when a stereoregular product is required such as a crystalline polypropylene homopolymer it is preferred to provide the selectivity control agent to the polymerization mixture. During polymerization, up to about 100 moles of selectivity control agent per mole of the titanium in the catalyst is satisfactory and when selectivity control agent is present, amounts from about 0.5 moles to about 25 moles per mole of titanium are preferred.

The polymerization process is conducted as a gas-phase process employing one or more fluidized beds of catalyst or is conducted as a slurry-phase process utilizing as diluent an inert material such as propane or other saturated hydrocarbon or alternatively a liquified monomer of the polymerization process such as propylene. The molecular weight of the polymer and to some extent the properties of the polymer product are suitably influenced by the provision to the polymerization system of molecular hydrogen as is known in the art. The polymerization is conducted in a batchwise manner or in a continuous or semi-continuous manner by constant or intermittent addition of the catalyst and/or olefin monomers to the polymerization zone.

The catalysts of the invention afford good yields of polyolefin product in the presence or absence of selectivity control agent. In the modifications where the olefin monomer is propylene or a higher α-olefin, the catalysts used in conjunction with the selectivity control agents exhibit the relatively high productivity while retaining a desirably high stereospecificity. The activity and specificity of such catalyst systems are sufficiently high so that polymer is obtained in good yield with properties sufficiently acceptable so that extraction and/or deashing steps are not required.

The invention is further illustrated by the following Illustrative Embodiments which should not be regarded as limiting. In the Illustrative Embodiments the productivity of the catalyst is determined in kilograms of product obtained per gram of titanium in the catalyst in a standard batch slurry-phase polymerization of one hour. When propylene is polymerized, the stereospecificity of the catalyst and specifically the stereospecificity to isotactic product is determined by measuring the xylene solubles (termed XS) in percent by weight of the polymer in accordance with the regulations of the U.S. Food and Drug Administration. The test for xylene solubles is conducted by dissolving a polypropylene polymer sample in xylene under reflux in a flask. The flask is then maintained in a water bath at 25° C. for 1 hour without stirring during which the xylene insoluble portion precipitates. The precipitate is removed by filtration and the solubles content is determined by evaporating an aliquot of the filtrate and drying and weighing the residue. The xylene solubles consist primarily of amorphous (atactic) polymer with a small amount of low molecular weight polypropylene.

ILLUSTRATIVE EMBODIMENT I

Procatalyst Precursors

A. Magnesium ethoxide (116 g, 1.01 mol), titanium tetraethoxide (95%, 81.2 g, 0.34 mol) and o-cresol (73 g, 0.67 mole) were slurried in 276 g of isooctane in a 1-liter, 3-neck flask equipped with a reflux condenser. After stirring at 85° C. for over 1 hour a clear, yellow, relatively non-viscous solution was obtained. The solution contained 4.5% magnesium. Into a crystallizing dish, 100 g of the solution was poured and the solvent was allowed to vaporate overnight under nitrogen. The resulting sticky solid was placed on an 80° C. hotplate for 4 hours to remove the remaining solvent and the resulting solid was ground to give a yellow powder. The molar ratio of cresol to magnesium to titanium was 2/3/1.

C. Magnesium ethoxide (11.6 g, 101 mmol), titanium tetraethoxide (95%, 8.12 g, 34 mmol) and o-cresol (7.3 g, 68 mmol) were slurried in 60 g of dichloromethane in a closed 4 oz bottle and stirred for 2 days in a 58° C. oil bath. The clear yellow solution was evaporated to dryness in a crystallizing dish under flowing nitrogen and the resulting solid was ground to give a yellow powder. The magnesium content was 12% by weight and the cresol/Mg/Ti molar ratio was 2/4/1.

E. Magnesium ethoxide (11.6 g, 101 mmol), titanium tetraethoxide (95%, 8.12 g, 34 mmol and 2,6-di-t-butyl-4-methylphenol, BHT, (14.9 g, 68 mmol) were slurried in 35 g of cyclohexane in a closed bottle. While this mixture was stirred in a 105° C. oil bath, slow dissolution took place. After 36 hours, solid still remained and an additional 74 g of cyclohexane was added. The slurry was stirred at 105° C. for an additional day and then cooled overnight. The mixture was then filtered to give a yellow solution and about 2.7 g of solid. The solvent of the solution was then removed by evaporation to give 9.5 g of orange-yellow powder. The molar ratio of BHT/Mg/Ti was 2/3/1.

F. Magnesium ethoxide (11.6 g, 101 mmol), titanium tetraethoxide (95%, 8.12 g, 34 mmol), o-cresol (3.65 g, 34 mmol) and BHT (7.45 g, 34 mmol) were slurried in 50 g of cyclohexane in a closed 4 oz bottle. The mixture was stirred overnight in a 90° C. oil bath to produce a clear, yellow solution. The solvent was removed from the solution by evaporation and the resulting solid was ground to a clear yellow powder.

G. Magnesium ethoxide (11.6 g, 101 mmol), titanium tetraethoxide (95%, 8.12 g, 34 mmol) and 2,6-dimethylphenol were slurried in 50 g of isooctane in a closed 4 oz bottle and stirred for 4 hours in a 95° C. oil bath to obtain a clear yellow solution. The solution was allowed to evaporate under flowing nitrogen to give a solid which was ground to a yellow powder. The 2,6-dimethylphenol/Mg/Ti molar ratio was 2/3/1.

H. Magnesium ethoxide (11.6 g, 101 mmol), titanium tetraethoxide (95%, 8.12 g, 34 mmol) and phenol (6.39 g, 68 mmol) were slurried in 50 g of cyclohexane in a closed 4 oz bottle and stirred for 4 hours in a 95° C. oil bath to obtain a clear solution. The solution was allowed to evaporate to dryness under flowing nitrogen and the resulting solid was ground to a powder. The molar phenol/Mg/Ti ratio was 2/3/1.

J. Magnesium ethoxide (11.6 g, 101 mmol), titanium tetraethoxide (95%, 81.2 g, 34 mmol) and 2,6-dimethylphenol (8.26 g, 68 mmol) were slurred in 50 g of isopentane in a closed 4 oz bottle and stirred for 10 hours in a 53° C. oil bath to obtain a clear solution with about 0.2 g of solid remaining. This same amount of solid remained after an additional 14 hours of stirring. The solution was decanted from the solid and allowed to evaporate under flowing nitrogen to give a pale yellow solid.

ILLUSTRATIVE EMBODIMENT II

Precursor Preparation

Polyolefin polymerization procatalysts were produced from the procatalyst precursors of Illustrative Embodiment I by, in one method, slurrying a quantity of the precursor and of diethylaluminum chloride, DEAC, (as a 20% or 25% by weight solution in heptane) in a 4 oz bottle. The mixture was originally yellow but turned pale green and finally dark upon warming to about 40° C. in an oil bath. After 30 minutes of warming, the slurry was filtered and the solids obtained were washed twice with isooctane and dried under flowing nitrogen to provide procatalyst as a free flowing, red-brown powder.

In an alternative method using ethylaluminum dichloride, EADC, a precursor of Illustrative Embodiment I and the ethylaluminum dichloride (as a 20% by weight solution in heptane) were slurried in a 4 oz bottle. The bottle and contents were placed in an 80° C. oil bath and shaken and vented over about 10 minutes. The slurry was then filtered and the solids obtained were washed with isooctane and dried under flowing nitrogen to yield procatalyst as a brick-brown powder.

Procatalysts prepared by these procedures are listed in Table I with the quantities of reactants and an indication of when the alkylaluminum compound was heated before mixing with the procatalyst precursor. The results of an elemental analysis for each procatalyst is also listed.

TABLE I

| Run No. | Quantities of Precursor and Organoaluminium Compound | Elemental Analysis, % wt. | | | |
|---|---|---|---|---|---|
| | | Ti | Mg | Cl | Al |
| 1 | 4 g of A, 30 g 25% DEAC (Hot) | 7.5 | 11.9 | 49.5 | 3.8 |
| 2 | 4 g of A, 60 g 20% DEAC (Hot) | 9.2 | 14.7 | 53.9 | 4.9 |
| 3 | 4 g of A, 30 g of EADC | 6.0 | 14.9 | — | 5.6 |
| 4 | 4 g of A, 30 g of EADC (Hot) | 7.9 | 12.8 | 61.1 | 4.5 |
| 5 | 4 g of A, 2 × 30 g of 20% DEAC (Hot) | 7.5 | 12.4 | 51.6 | 4.2 |
| 6 | 8 g C, 60 g of 20% DEAC (Hot) | 7.5 | 12.7 | 51.0 | 3.4 |
| 7 | 4 g A, 2 × 30 g 20% EADC | 8.1 | 12.6 | 63.8 | 5.2 |
| 8 | 4 g E, 30 g, 20% EADC (Hot) | 3.5 | 15.5 | 55.7 | 4.4 |

TABLE I-continued

| Run No. | Quantities of Precursor and Organoaluminium Compound | Elemental Analysis, % wt. | | | |
|---|---|---|---|---|---|
| | | Ti | Mg | Cl | Al |
| 9 | 4 g F, 30 g, 20% EADC (Hot) | 5.8 | 13.9 | 59.7 | 3.4 |
| 10 | 4 g G, 30 g, 20% EADC (Hot) | 8.0 | 12.2 | 61.5 | 4.4 |
| 11 | 4 g H, 30 g, 20% EADC (Hot) | 6.9 | 11.4 | 57.3 | 4.4 |
| 12 | 4 g J, 30 g, 20% EADC (Hot) | 8.0 | 13.0 | 56.2 | 5.0 |

ILLUSTRATIVE EMBODIMENT III

In a number of polymerizations, the procatalysts of Illustrative Embodiment II were employed as 5% by weight slurries in mineral oil. In these polymerizations, triethylaluminum (TEA) was used as a 0.28M solution in isooctane. The selectivity control agent (SCA) was diisobutyldimethoxysilane (DIBDMS) except where otherwise stated and was used neat. In each polymerization, a mixture of 6.0 ml of TEA solution (1.68 mmol) and 60 μl of DIBDMS (0.32 mmol) were injected at 65° C. into 2.7 liters of propylene in a one-gallon autoclave which also contained 42 mmol of hydrogen followed by 0.5 ml of the 5% procatalyst slurry (0.017 to 0.046 mmol Ti). Each polymerization was conducted at 65° C. for 1 hour. The results are shown in Table II where yield represents kg of polymer/g of catalyst and the xylene solubles (X.S.) were determined as described above. Also shown are deviations, if any, from the above procedure.

TABLE II

| Procatalyst of Run No. | Yield, kg/g cat. | X.S. % wt. | Deviation |
|---|---|---|---|
| 1 | 4.1 | 18.6 | |
| 2 | 11.8 | 19.9 | |
| 3 | 13.0 | 17.1 | |
| 4 | 13.9 | 17.1 | |
| | 10.4 | 14.1 | Procatalyst and SCA premixed |
| | 7.6 | 9.7 | All components premixed |
| | 9.6 | 18.0 | 1:1 ratio TEA/SCA |
| | 6.9 | 23.4 | no H$_2$ |
| | 29.4 | 73.6 | Al/Ti ratio about 5 |
| | 11.2 | 64.6 | Al/Ti ratio about 2 |
| 5 | 5.8 | 19.2 | |
| 6 | 4.7 | 18.9 | |
| 7 | 10.0 | 19.1 | |
| 8 | 7.5 | 14.1 | |
| 9 | 8.9 | 17.5 | |
| 10 | 12.6 | 17.9 | |
| 11 | 8.7 | 17.2 | |
| 12 | 9.2 | 15.2 | |

ILLUSTRATIVE EMBODIMENT IV

Polymerization of ethylene: Using the same apparatus and cocatalyst amounts as for the propylene polymerization in Illustrative Embodiment III, the procatalyst of run #2 (Illustrative Embodiment II) was injected into 1.0 liter of isooctane at 60° C. into which ethylene gas was flowing at a rate of about 2.5 g/minute. After 125 g of ethylene had flowed, the reaction was terminated. The resulting slurry was filtered and the solids air dried to produce 125 g of free flowing, white granular polyethylene.

COMPARATIVE EXAMPLE

DIRECT HALOGENATION OF PRECURSOR SOLUTION

DEAC (20 g of 20% heptane solution, 33 mmol) was diluted with 30 g of isooctane then a solution prepared as in 'A' of Illustrative Embodiment I (6.26 g, 12.4 mmol Mg) was added dropwise to that stirring solution. The resulting tan colored slurry was filtered and the solids washed three times with warm isooctane and dried under moving nitrogen to yield a tan powder. A propylene polymerization, using this procatalyst, was carried out at 60° C. as described in Illustrative Embodiment III to produce 0.1 kg of polymer/g of procatalyst. This represents an activity of only about 1% of that of the catalysts of this invention, wherein the procatalyst precursors have been isolated as solids previous to treatment with DEAC.

What is claimed is:

1. An olefin polymerization catalyst obtained by contacting an alkylaluminum halide with the solid reaction product consisting essentially of magnesium alkoxide, titanium tetraalkoxide and a phenolic compound selected from the group consisting of phenol and phenols substituted by alkyl, alkoxy, halo, and dialkylamino.

2. The catalyst of claim 1 wherein the alkylaluminum halide is represented by the formula $$R_nAl(Y)_{3-n}$$

wherein R is $C_1$ to $C_8$ alkyl, Y is halogen and n is 1 or 2.

3. The catalyst of claim 2 wherein the reaction product is represented by the formula $$Mg_3Ti(OR)_8X_2$$

wherein R independently is alkyl of up to 4 carbon atoms and X independently is monovalent anion of a phenolic compound.

4. The catalyst of claim 3 wherein Y is chlorine.
5. The catalyst of claim 4 wherein X is the anion of o-cresol.
6. The catalyst of claim 5 wherein R is ethyl.
7. The catalyst of claim 6 wherein n is 1.
8. The catalyst of claim 6 wherein n is 2.
9. The catalyst of claim 4 wherein X is the anion of 2,6-di-t-butyl-4-methylphenol.
10. The catalyst of claim 9 wherein R is ethyl.
11. The catalyst of claim 10 wherein n is 1.
12. The catalyst of claim 10 wherein n is 2.

* * * * *